(12) United States Patent
Kwon

(10) Patent No.: US 9,619,161 B2
(45) Date of Patent: Apr. 11, 2017

(54) STORAGE SYSTEM HAVING SECURITY STORAGE DEVICE AND MANAGEMENT SYSTEM THEREFOR

(71) Applicant: Yong-Gu Kwon, Hwaseong-si (KR)

(72) Inventor: Yong-Gu Kwon, Hwaseong-si (KR)

(73) Assignee: Sung Gon Cho, Los Angeles, CA (US)

( * ) Notice: Subject to any disclaimer, the term of this patent is extended or adjusted under 35 U.S.C. 154(b) by 0 days.

(21) Appl. No.: 14/897,470

(22) PCT Filed: Nov. 4, 2014

(86) PCT No.: PCT/KR2014/010490
§ 371 (c)(1),
(2) Date: Dec. 10, 2015

(87) PCT Pub. No.: WO2015/102220
PCT Pub. Date: Jul. 9, 2015

(65) Prior Publication Data
US 2016/0117124 A1    Apr. 28, 2016

(30) Foreign Application Priority Data

Dec. 31, 2013  (KR) .................. 10-2013-0169159
Feb. 28, 2014  (KR) .................. 10-2014-0023938

(51) Int. Cl.
*G06F 12/14*  (2006.01)
*G06F 3/06*   (2006.01)
*G06F 21/62*  (2013.01)

(52) U.S. Cl.
CPC .......... *G06F 3/0622* (2013.01); *G06F 3/0637* (2013.01); *G06F 3/0674* (2013.01); *G06F 12/1408* (2013.01); *G06F 12/1466* (2013.01); *G06F 21/6209* (2013.01)

(58) Field of Classification Search
CPC .. G06F 12/1408; G06F 3/0622; G06F 3/0674; G06G 12/1466
USPC .................................................. 711/163, 164
See application file for complete search history.

(56) References Cited

U.S. PATENT DOCUMENTS

| | | | |
|---|---|---|---|
| 6,581,162 B1 * | 6/2003 | Angelo | ................. G06F 21/602 380/277 |
| 7,725,490 B2 * | 5/2010 | Hitchen | .............. G06F 21/6218 707/783 |
| 2002/0002654 A1 * | 1/2002 | Tomohiro | ........... G06F 12/1466 711/103 |
| 2004/0019800 A1 * | 1/2004 | Tatebayashi | ............ G06F 21/10 726/17 |

(Continued)

FOREIGN PATENT DOCUMENTS

| EP | 3 091 472 A1 * | 9/2016 | ............. G06F 21/78 |
|---|---|---|---|
| JP | 2006-031575 A | 2/2006 | |

(Continued)

*Primary Examiner* — Pierre-Michel Bataille
(74) *Attorney, Agent, or Firm* — Chanmin Park

(57) ABSTRACT

The present invention relates to a storage system of a computer and, more particularly, to a storage system and method having a security storage device including a secured disk area, wherein the existence or absence of the secured disk area cannot be known through the application of an operating system in a deactivated state, and the secured disk area can be activated and used only by a digital key and password when a user's password is input through an application including the digital key.

25 Claims, 7 Drawing Sheets

(56) References Cited

U.S. PATENT DOCUMENTS

| | | | |
|---|---|---|---|
| 2008/0313718 A1* | 12/2008 | Milgramm | G06F 21/32 |
| | | | 726/5 |
| 2011/0023124 A1* | 1/2011 | Selander | G06F 21/10 |
| | | | 726/26 |
| 2011/0231909 A1* | 9/2011 | Shibuya | G06F 21/31 |
| | | | 726/5 |
| 2011/0265151 A1* | 10/2011 | Furlan | H04L 12/2809 |
| | | | 726/4 |
| 2015/0310231 A1* | 10/2015 | Lin | G06F 21/72 |
| | | | 713/189 |

FOREIGN PATENT DOCUMENTS

| | | |
|---|---|---|
| KR | 10-2009-0067649 A | 6/2009 |
| KR | 10-2009-0094876 A | 9/2009 |
| KR | 1020130101646 | 9/2013 |

* cited by examiner

STORAGE SYSTEM HAVING SECURITY STORAGE DEVICE AND MANAGEMENT SYSTEM THEREFOR

TECHNICAL FIELD

The present invention relates to a storage system of a computer and, more particularly, to a storage system and method having a security storage device including a secured disk area, wherein the existence or absence of the secured disk area cannot be known through the application of an operating system in a deactivated state, and the secured disk area can be activated and used only by a digital key and password when a user's password is input through an application including the digital key.

BACKGROUND TECHNOLOGY

Grafting of dissemination and popularization of high speed internet and wireless communication technology constructed cloud computing environment in which users can access the internet anytime, anywhere and receive various services.

And as dissemination of various computers including desktop computers, notebook computers, tablet computers, smartphones and smart pads became universal, most users store and use important information in computers.

Such dissemination of computers and construction of cloud computing environment assist people to perform tasks easily, provide fun, and provide convenience in various fields.

However, this way of storing and managing important information in computers and using cloud computing environment provide environment in which a user's terminal can be hacked anytime, anywhere by someone, and her important information stored in the computer can be easily exposed and leaked to an hacker or others around her.

Because of these problems, various security systems are applied to computers. Such security systems include a log-in type security system that requires input of ID (Identification) and password when the computer is booted; and an encryption type storage device security system disclosed in Korean Patent Application Publication [10-2009-0067649], in which the entire area of a computer storage device or part of it is encrypted, or only particular files that are selected are encrypted, and said partial area or file can be used only through a specified authentication procedure.

While storage security systems were used in locations like corporations or internet cafes in which multiple people use multiple computers, the recent trend is that they are extended to individuals due to dissemination of portable computers, etc.

However, most storage security systems require, like the above-mentioned Korean Patent Application Publication [10-2009-0067649], only input of ID and password, or password only to allow use of encrypted security area, thus have problems of low security.

That is, conventional storage security systems have problems that when ID and password, or password only is exposed, the entire information in the computer can be leaked.

In addition, conventional storage security systems have problems that it is possible to know that there are separate encrypted areas in a storage device even though ID and password are not known, and it may induce hackers or other specialists to try hacking of ID and password for arbitrary areas, which in turn causes ID and password to be hacked by such tries, which in turn causes information to be leaked.

DETAILED DESCRIPTION OF INVENTION

Technical Tasks

Accordingly, the purpose of the invention is to provide to a storage system and method having a security storage device including a secured disk area, wherein the existence or absence of the secured disk area cannot be known by anything including an application of an operating system in a deactivated state, and the secured disk area can be activated and used only by a digital key and password when a user's password is input through an application including the digital key.

Solution of Tasks

In order to achieve the above-mentioned purpose, the present invention provides a storage system comprising a secured storage device characterized in that the secured storage device comprises a storage module comprising a secured disk of arbitrary size comprising a digital key area in which a digital key is stored and a secured data area that is encrypted with said digital key; a kernel layer module that deactivates said secured disk in a security setting mode, and activates said secured disk by said digital key in a security setting release mode, and a key application module that mounts a secured disk sub-system, which processes input/output requests for said activated secured disk, to an application module that can manage data stored in said storage module at a security setting release request by execution of a key application that comprises a digital key that is identical to said digital key; controls said kernel layer module and activates the secured disk by the digital key of said key application, which is identical with the digital key stored in the digital key area of said secured disk; and processes input/output requests for the data stored in said activated secured disk through said kernel layer module.

Said application module is driven in one of the operating systems including Windows, Linux, Mac, Unix, Android and iOS, and comprises either of an explorer or a shell program that corresponds to said operating systems.

Said key application module comprises a digital key storage that comprises a digital key that is identical to the digital key stored in the digital key area of the secured disk; a service executor that is activated at execution of said key application, installs a secured disk processor at said kernel layer module, activates said secured disk by said digital key at setting of user password and input of the set user password, and processes input/output requests to said secured disk; and a service execution monitor that monitors said service executor, sets up said security setting mode at occurrence of an event forcefully terminating the service executor, unmounts said secured disk sub-system from said application module and terminates the service executor.

Said service executor comprises a display processing part that provides a user interface means comprising security setting and release means to be displayed on a screen at execution of said key application; an input processing part that processes input data that is input through said user interface means; and a service execution control part that comprises a secured disk processing installation part that installs the secured disk processor at execution of said key application and deletes said secured disk processor at termination of the key application, a password setting part that receives input of a user password for security setting through a security setting and release means of the user interface means, stores and sets the user password; compares the user password that is input through said security setting and release means and a pre-set password at occurrence of a security setting release request; and activates said secured disk after authentication, a mounting processing part that monitors input/output occurring at the application module through said input processor, and when a data processing input/output event for the secured disk of the activated storage module is detected, process the input/output request according to processing of the corresponding data through the secured disk processor of said kernel layer module.

Said system further comprises a secured disk creation application module that provides a secured disk setting means on a computer screen, receives input of a capacity including a starting sector to be set for a secured disk through said secured disk setting means and sets the secured disk, sets a digital key area of predetermined capacity from said starting sector, and stores the digital key in said digital key area.

Said digital key comprises a disk volume name, which is used at security setting release of the secured disk, a disk serial number, disk size data, starting sector data, an encryption key uniquely assigned per said key application, and sector offset data that indicates the distance to a next duplicate digital key.

Said digital key further comprises automatic lock setting data that specifies whether conversion to security setting mode that closes said secured disk is automatically performed when there is no use of a computer for a pre-determined time.

Said digital keys are constructed to be two or more in said digital key area, and starting sector data for each of said plurality of digital keys is constructed random.

Each of said digital keys further comprises user option information set by a user after installation of said key application.

Said user option information comprises disk volume name, user password, password for destruction, and automatic lock setting data that specifies whether conversion to security setting mode that closes said secured disk is automatically performed when there is no use of a computer for a pre-determined time.

Said secured disk creation application module comprises a secured disk setting part that displays a user interface means on a screen and receives secured disk creating information that includes starting sector of the secured disk, secured disk volume data, and secured disk size data; a digital key constitution part that receives the secured disk creating information from said secured disk setting part, creates a unique password key and destruction key, creates a digital key including said secured disk creating information, password key, destruction key, sector offset and secured disk type information, and stores the created digital key to the digital key area of the storage module; and a key application creating part that creates a unique key application that comprises said digital key.

Said kernel layer module comprises an input/output handler that handles input/output requests for folders and files, which are generated from the disk sub-system of the application module; a file system processor that receives input of said requests form said input/output handler at said security setting mode and processes the requests, and performs processing folders and files of said secured disk area at said security setting release mode; a device processor that is connected between said file system processor and the storage module, which is a physical storage device, and controls the storage module according to said request created at said file system processor; and a secured disk processor that is constructed by said key application module, detects the storage module comprising the secured disk and the secured disk of said storage module, receives input/output requests for folders and files created by the secured disk sub-system of said application module through said input/output handler and the file system processor, and directly processes the input/output requests or processes through said device processor depending on the type of the input/output requests.

Said secured disk processor comprises a component registration part that detects the storage module comprising the secured disk, detects the secured disk in the storage module, creates connection information to process input/output requests for folders and files in the secured disk created by the key application module, and transfers the request created from said key application module with the created connection information to said file system processor; and a drive off processing part that deletes said created connection information at occurrence of said key application termination event and thereby terminates driving of the secured disk processor.

Said component registration part comprises an object creating part that creates a kernel device object for direct processing of said request created from said key application module, and initializes data structure; a secured disk detecting part that receives input of the digital key from said key application module, and detects the storage module comprising the secured disk with said digital key; a sub-system packet processing part that processes packets for the request created from said key application module; and a file system packet processing part, which at occurrence of input/output requests for the secured disk area by said disk sub-system, performs processing of packets for said input/output requests and then returns the result.

Said data structure comprises a first item for creating thread for parallel processing of packets of said file system processing part and for storing the information; a second item for receiving the encrypting key for encrypting and decrypting the data, which are provided as being attached to input/output to the secured disk area among packets of the file system processing part, from the key application module, and storing the encrypting key; a third item for receiving the digital key from the key application module and storing the digital key; a fourth item for storing object handles of the storage module having the secured disk; and a fifth item for storing information for plug and play notice, which is notified when the storage module having the secured disk is separated from the computer by the user.

When the automatic lock setting data is set for automatic lock, said key application module counts the time in which the computer is not used, and if there is no computer use for a predetermined time, drives said drive off processing part, thereby deletes the connection information registered by the component registration part, deactivates or deletes the secured disk processor, and terminates itself, thereby setting the security setting mode.

The area for the secured disk of said storage module is partitioned into unassigned area.

In order to achieve the above-mentioned purpose, the present invention provides a method of managing a storage system comprising a secured storage device that comprises steps of: creating secured storage device, in which a secured disk creation application module that is created and activated by execution of a secured disk creation application creates a storage device comprising an ordinary disk and a secured disk that comprises a digital key area in which a unique digital key is stored and a secured data area encrypted by said digital key; activating secured disk, in which a key application module activated by execution of a key application comprising a digital key identical with the digital key stored in the digital key area of said secured disk finds the secured storage device comprising the digital key area comprising the digital key identical with said digital key, hides said secured disk area in a security setting mode, at occurrence of security setting mode release request by user password of a user mounts a secured disk sub-system in an application module, makes the volume of said secured disk visible by its own digital key identical with the digital key stored in said digital key area, thereby sets that data can be input/output to said secured disk; and using secured disk, in which said secured disk sub-system inputs/outputs data to said activated secured disk.

Said creating secured storage device step comprises steps of setting up secured disk area, in which the secured disk creation application module provides secured disk setting up means through a display processing part, receives input of capacity including a starting sector for setting up as secured disk through said secured disk setting up means, and sets up a secured disk; and constructing digital key, in which said secured disk creation application module sets up a digital key area of predetermined capacity from the starting sector and constructs a digital key in said digital key area.

Said creating secured storage device step further comprises a step of creating a key application that creates a key application comprising said digital key.

Said digital key comprises a disk volume name, which is used at security setting release of the secured disk, a disk serial number, disk size data, starting sector data, an encrypting key uniquely assigned per said key application, and sector offset data that indicates the distance to a next duplicate digital key.

Said digital keys are constructed to be two or more in said digital key area, and the staring sector data for each of said plurality of digital keys is constructed random.

Said activating secured disk step comprises steps of constructing secured disk processor in which at execution of the key application, the driven key application module constructs a secured disk processor in a kernel layer module; displaying user interface in which said key application module displays user interface means; checking secured disk activation request in which occurrence of secured disk activation request through said user interface means is checked; deciding user password input in which if said activation request occurred, whether a user password which is input through said user interface means is input is checked; and activating secured disk in which if it is decided that there is an input at said deciding user password input step, the user password input is compared with a pre-set password and if they are identical, said secured disk is activated.

Said activating secured disk step further comprises steps of new user deciding, in which at said deciding user password input step, if it is decided that a user password is input, whether the user is a new user is decided according to whether there is a pre-registered password; user password registration user interface means displaying, in which if the user is a new user, user interface means comprising user password registration means is displayed; and user password registration, in which if user password is input through said user interface means, the user password input is stored in a user option area of the digital key.

The method further comprises a step of deactivating secured disk, in which at occurrence of secured disk deactivation event during use of said secured disk, the key application module deletes a secured disk processor, requests termination of driving the key application module to the operating system, thereby deactivating the secured disk.

Said deactivating secured disk step comprises steps of deleting secured disk processor, in which at occurrence of key application driving termination event during use of said secured disk, the key application module drives a drive off processing part to delete registered components thereby removing the secured disk processor; and terminating driving the key application module, in which said key application module request its driving termination to the operating system, thereby terminating driving.

The method further comprises a step of destructing secured disk, in which if a destruction password is input through user interface means displayed by activation of the key application, the key application module compares the destruction password input with a destruction password of the digital key, and if they are identical, permanently deletes the digital key in the digital key area of said secured disk thereby destructing data stored in the secured data area of the secured disk so that the data cannot be used.

The method of claim further comprises a step of recovering destructed secured disk, in which after said destructing secured disk step, the key application module driven by re-execution of said key application finds the digital key area of the destructed secured disk with starting sector data of the digital key and the digital key area data stored in a digital key storage, and stores the digital key in the digital key area found thereby activating said secured disk again.

Effects of the Invention

The present invention has an effect that because the secured disk encrypted with said digital key can be activated or deactivated only through the unique key application having the unique digital key and password set by the user, strong security is provided.

In addition, the present invention has an effect that because the secured disk is detected with digital key method, there is no need to manage various mapping table areas that are used in conventional similar technology, and thus security of the secured disk is strengthened even further by not managing mapping tables.

In addition, the present invention has an effect that because it provides pre-set unique destruction key, and if a user inputs said destruction key, said digital key only is destroyed by said destruction key, the data in the secured disk encrypted with said digital key cannot be approached and used, thereby preventing leak of important data.

In addition, the present invention has an effect that because if only the application, which includes said destructed digital key, is kept, the data stored in said secured disk can be used again by only copying the digital key, which is included in the application, to the area, in which said destructed digital key was stored, through said application later, loss of user's important data is prevented and security is improved also.

In addition, the present invention has an effect that because by operating the timer, when the computer is not used for a specified time, or a waiting screen conversion event occurs, the secured disk is locked, and thus the data stored in the secured disk are protected more securely.

BEST EMBODIMENT OF THE INVENTION

Referring to the attached drawings, the constitution and operation of a storage system that comprises a secured storage device according to the present invention are explained, and method for managing secured storage device in the system is explained.

Figure 1:
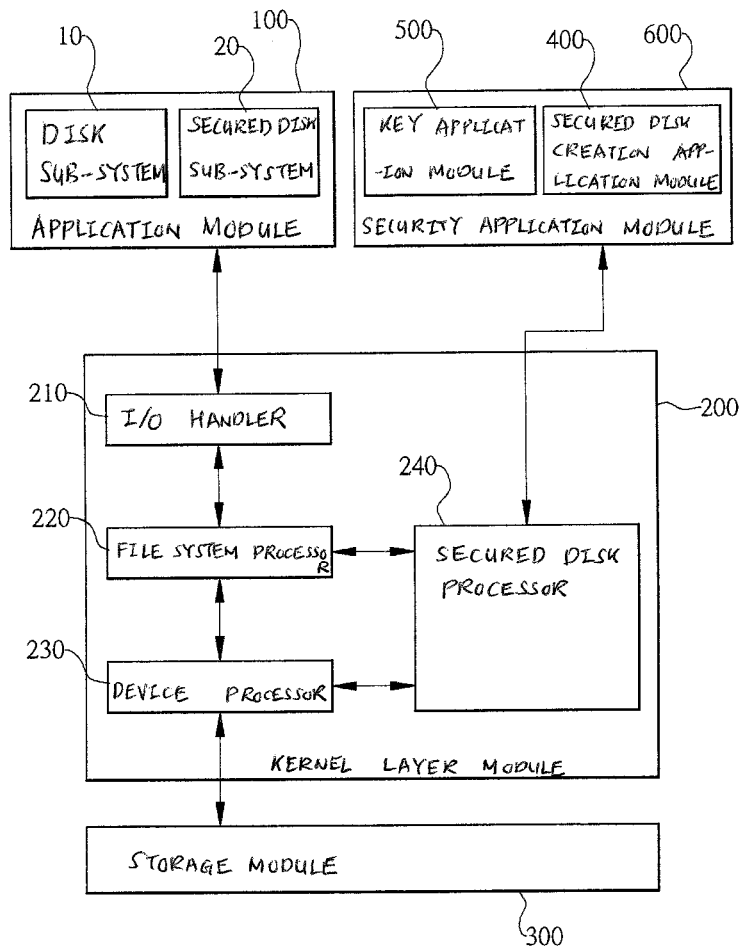
FIG. 1 is a drawing showing constitution of a storage system that comprises a secured storage device according to the present invention.
Figure 5:
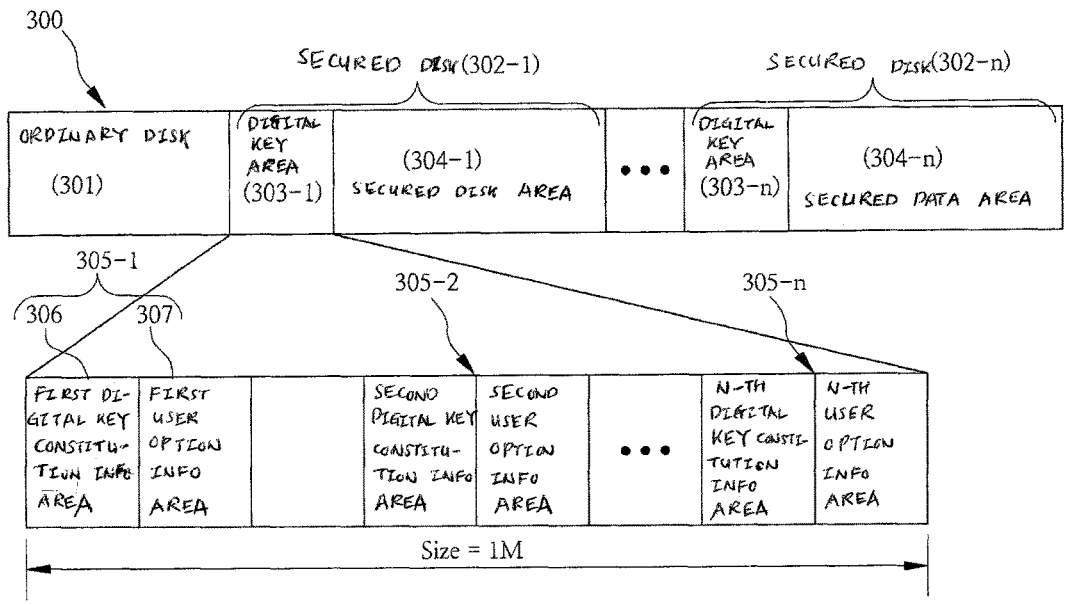
FIG. 5 is a drawing showing data storage constitution of the secured storage device according to the present invention.

FIG. 1 is a drawing showing constitution of a storage systems that comprises a secured storage device according to the present invention, and FIG. 5 is a drawing showing data storage constitution of the secured storage device according to the present invention. Below explanation refers to FIGS. 1 and 5.

A storage system that comprises a secured storage device according to the present invention includes an application module (100), a kernel layer module (200), a storage module (300) and a security application module (600).

The storage module (300) according to the present invention is a large capacity storage device having any size capacity of 16G, 32G, 100G, 1T, etc., and as shown on FIG. 5, includes an ordinary disk (301) comprising an ordinary area that stores ordinary data, and a secured disk (302) comprising a digital key area (303), and a secured data area (304) that stores secured data encrypted with said digital key.

The digital key area (303) may be determined to have arbitrary size. FIG. 5 shows that it has 1M size. The digital key, which is stored in the digital key area (303) may comprise one original digital key (305-4), or as shown on FIG. 5, one original digital key (305-1) and a plurality of duplicate digital keys (305-2, . . . , 305-$n$), which duplicated said original digital key (305-1). Each of said original digital key (305-1) and duplicate digital keys (305-2, . . . , 305-$n$) have the same starting sector data and may have different sector offset data for the last duplicate digital key (305-$n$) only depending on embodiments. Or on another embodiment, the sector offset for each of the original digital key (305-1) and duplicate digital keys (305-2, . . . , 305-$n$) may be differently constituted (the case of random constitution but the sector offset data for the original digital key and duplicate digital keys for the digital key that is stored in said digital key area (303), which correspond to the sector offset data for the original digital key and duplicated digital keys for the digital key stored in the secured disk application module (400) are the same.) Other data will be constituted the same.

Said original digital key (305-1) and duplicate digital keys (305-2, . . . , 305-$n$) include encrypted key, disk volume name, password, destruction key (or called "destruction password"), disk serial number, starting sector data, secured disk size, automatic lock setting data, sector offset data and secured disk type data.

The encrypted key is the world-wide unique Global Unique Identifier: GUID, a practical digital key.

The disk volume name is a name that is visible on a screen (File Explorer in Windows) or can be searched on prompt when the secured disk (302) is open.

The password is the initial password that is used to activate the secured disk and is a user password input by the user. Said user password is one-way hash processed using SHA1 algorithm, and the processed data is stored.

The destruction key is a global unique identification information that is simultaneously created with said encrypted key. The purpose of the key is to destruct the digital key in the digital key area (303) so that the secured disk (302) cannot be found.

A serial number provided by a mass storage device manufacturer is obtained and used for the disk serial number.

For the starting sector data, the sector number of the sector, from which the secured disk (302) starts in said storage module (300), can be used. Preferably, said starting sector data is constituted to have different starting sector data per storage device that is used as the secured storage device for difficult readability of the secured disk (302) of the storage module (300).

The secured disk size data is the capacity data of the secured disk.

The automatic lock setting data is data showing whether the secured disk (302) will be automatically closed when there is no use of computer after the secured disk (302) is activated, that is, whether to make the secured disk (302) invisible by setting security. Automatic lock setting may be set as "0" (or "1"), and automatic lock setting release may be set as "1" (or "0").

The sector offset data represents how many sectors are passed where the next duplicate digital key (on among 305-2, . . . , 305-$n$) is duplicated, from the current original digital key (305-1) or the duplicate digital key (one among 305-2, . . . , 305-n). It may be set as a certain number of sectors (for example, 50 sectors) or may be set randomly.

Said original digital key (305-1) and duplicate digital keys (305-2, . . . , 305-n) may further include user option information. Afterwards, the above-mentioned uniquely created information including encrypting key, disk volume name, password, destruction password, disk serial number, starting sector data, secured disk size, automatic lock setting data, sector offset data and secured disk type data, are explained as "digital key constitution information," which is distinguished from the user option information. The area storing said digital key constitution information is named "digital key constitution information area (306)," and the area storing the user option information is named "user option information area (307)." Said digital key constitution information area (306) and user option information area (307) may comprise 512 Byte. The digital key constitution information stored in the digital key constitution information area (306), and the user information stored in the user option information area (307) will be stored as encrypted.

The secured disk type data is related to whether a user is allowed to change pas word or configuration items when the secured disk (302) is created.

Said user option information is information that may be applied when part of constitution items of the digital key that was used at initial creating of the secured disk (302) are set to be changeable by the user with the type of the secured disk, and may include user defined disk volume name, said user password, password for destruction, and automatic lock data, etc.

Said digital key area (303) may be constituted having the size of said capacity from the starting sector of said secured disk (302), or may be constituted having the size of said capacity from the ending sector of said secured disk (302). However, it would be preferable to be constituted at the starting sector of the secured disk (302). The size of said digital key area may be set to have various sizes. Preferably, it may be constituted to be about 1 Mbyte.

The data stored in the secured data area (304) are stored in encrypted state. AES256, etc. may be applied as the encryption method.

The secured disk (302) comprising the digital key area (303) storing the above-mentioned digital key and the secured data area (304) may be constituted as one or more than one on a physical storage (300) as shown on FIG. 5.

The application module (100) is an application executed in a user mode (or "application layer") of the operating system, and may be an explorer or shell program, etc. of operating systems including Windows, Linux, Mac, Unix, Android or iOS, etc.

More particularly, the application module (100) includes a disk sub-system (and a secured disk sub-system (20) according an embodiment of the present invention.

The disk sub-system (10) is operated together with the operation of the application module (100), and performs processes including storing data like files and folders in the storage module (300) through the kernel layer module (200), and reading and displaying the stored data, etc.

The secured disk sub-system (20) processes input and output for the secured disk (302) of the storage module (300), which was created by the key application according to the present invention. When input/output of data occurs for the activated secured disk (302), said secured disk sub-system (20) encrypts data through the secured data processor (240) and stores it in the secured disk (302), and reads and decrypts the stored encrypted data.

The security application module (600) is created by an application like Active X, or security application, etc. that are provided by a service server (now shown) connected via web, or by a security application stored in the storage module (300) or another storage device; constitutes the secured disk (302) on the storage module (300); and mounts the secured disk sub-system on said application module (100). In addition when the operating system is Windows, said security application may be constituted in library forms of xxx.dll and xxx.lib, etc. and provided to a third application. That is, said security application module (600) may be constituted so that it is created by a third application that is operated by loading the libraries including xxx.dll and xxx.lib, etc. according to the present invention.

Such security application module (600) includes a key application module (500) that is activated by a key application, and a secured disk creation application module (400) that is activated by a secured disk creation application. In addition, when the secured disk (302) is formed in the storage module (300), said key application only may be constituted in the form of xxx.dll and xxx.lib.

The key application module (500) is activated when the key application according to the present invention is executed, then it activates the secured disk (302) of the storage module (300) in the security setting release mode, and mounts the secured disk sub-system (20) to the application module (100). When an event deactivating said secured disk occurs, the key application module (500) unmounts the secured disk sub-system from the application module (100). Said secured disk deactivation event may be a key application termination event according to normal termination or forced termination of said key application module (500) by user interface means, which was activated at the activation of the key application module (500), or a storage module separation event that is created by separation of the storage module (300) that includes the secured disk (302).

The kernel layer module (200) is constituted among the application module (100), the security application module (600) and the storage module (300), and performs data input/output processing for input/output of the stored data and data to be stored in the storage module (300) in response to input/output requests occur in the application module (100).

More particularly, the kernel layer module (200) comprises an input/output handler (210), a file system processor (220), a device processor (230) and a secured disk processor (240).

The input/output handler (210) manages the overall input/output (I/O) to process the input/output generated by the disk sub-system (10) and the secured disk sub-system (20) of the application module (100). Said input/output handler (210) may be constituted to include I/O system service, object manager, security manager and I/O manager. Because the above-explained Windows I/O manager constitution is well-known, its detailed explanation is omitted.

The file system processor (220) performs data processing that is required to manage logical information constructed according to the operating system to store data including folders and files etc. in the storage module (300), to construct and provide data including folders and files etc. based on input/output provided through said input/output handler (210), or to provide the application module (100). In case that said operating system is Windows, said file system processor (220) may be the file system driver that processes data depending on file systems including NTFS (New Technology File System), FAT16 (File Allocation Table 16), FAT32 (File Allocation Table 32), etc.; and performs roles of constructing data including folders and files etc. according to said file systems and storing them in the storage module (300), and reading the stored data. Because this Windows file system construction is well-known, its detailed explanation is omitted.

For the data process request requested from said file system processor (220), the device processor (230) performs processing of corresponding data by controlling the physical storage (300), and returns the result to the file system processor (220).

At that same time that said key application module is activated, the secured disk processor (240) is created at the kernel layer module (200) by said key application module (500).

Thus created secured disk processor (240) receives control of the key application module (500), detects the storage module (300) that includes the secured disk (302), at security setting release mode, receives input/output requests according to data input/output from the secured disk subsystem (20) which mounted the secured disk (302) to the application module (100), and creates objects to process input/output requests that were input.

In addition, the secured disk processor (240) receives input of input/output requests for the data stored and to-be-stored in said detected secured disk (302), which corresponds requests generated in said security sub-system (20) through the input/output handler (210) and the file system processor (220); returns the processed result from performing the requests corresponding to the input/output requests to the secured disk sub-system (20) through the file system processor (220) and the input/output handler (210); or performs processes for the corresponding input/output requests at the secured disk (302) of the storage module (300) through the device processor (230).

When said secured disk processor (240) provides the requested data to the device processor (230), it encrypts the data according to the present invention; and decrypts the encrypted data, which was processed at the device processor (230) and read from the secured disk (302) of the storage system (300), and provides the data to the secured disk sub-system (20). In detail, in case that said input/output are input/output for information inquiry for the secured disk (302) (disk information, volume information, partition information, etc.), said input/output are processed through the secured disk sub-system (20)<->the input/output handler (210)<->the file system processor (220)<->the secured disk processor (240); and in case that said input/output are data input/output of files or folders to the secured disk (302), said input/output are processed through the secured disk subsystem (20)<->the input/output handler (210)<->the file system processor (220)<->the secured disk processor (240) <->the device processor (230). Method for said encryption may utilize AES256 (Advanced Encryption Standard 256) method, etc.

The constitution of said secured disk processor (240) is explained in detail below referring FIG. 4.

Said secured disk creation application module (400) is created at execution of the secured disk creation application in a user mode together with the application module (100), and creates the storage module (300) that includes the secured disk (302) according to the present invention. Detailed constitution and operation of said secured disk creation application module (400) are explained in detail below referring to FIG. 2.

Figure 2:
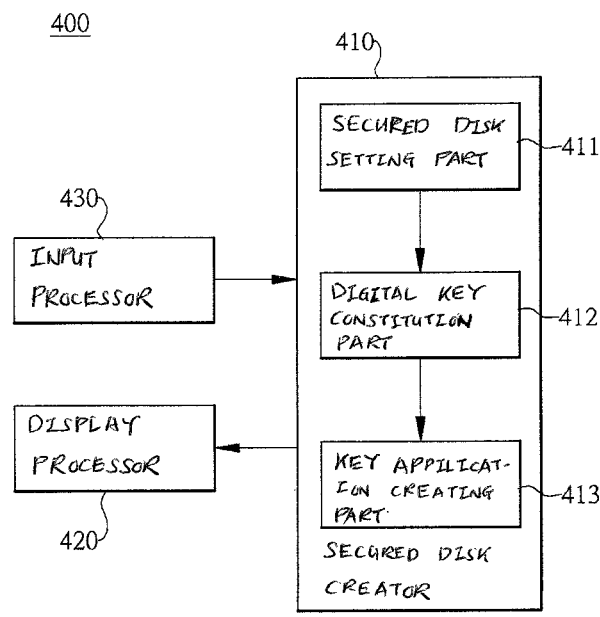
FIG. 2 is a drawing showing constitution of a secured disk creation application module of the storage system that comprises the secured storage device according to the present invention.

FIG. 2 is a drawing showing constitution of the secured disk creation application module of the storage system having the secured storage device according to the present invention.

Referring to FIG. 2, the secured disk creation application module (400) includes a secured disk creator (410), a display processor (420) and an input processor (430).

The display processor (420) displays on the screen of a computer, in which the secured disk creation application is executed, user interface means that includes secured disk creation means, etc. which can receive input of the starting sector to create the storage module (300) having the secured disk, capacity (size of the secured disk), and disk volume information, etc.

The input processor (430) receives input corresponding to said user interface means, and outputs it to the secured disk creator (410).

The secured disk creator (410) provides user interface means to said display processor (420), and receives secured disk creation information that is accordingly input through the input processor (430), creates the digital key that includes password key, destruction key, sector offset, sector starting data, disk size data, disk volume data, etc. then calls the secured disk processor (240), encrypts and stores said digital key in the digital key area (303) that has predetermined size from the starting sector of said starting sector data of the storage module (300), and creates the secured disk (302) having the secured data area (304) that encrypts and stores data after said digital key was stored.

Specifically, the secured disk creator (410) includes a secured disk setting part (411) that provides said user interface means through the display processor (420) and receives input of secured disk creation information including starting sector of the secured disk, secured disk volume data, and secured disk size data, etc.; a digital key constitution part (412) that receives secured disk creation information from said secured disk setting part (411), creates unique encryption key and destruction key, creates digital key including said secured disk creation information, encryption key, destruction key, sector offset, and secured disk type data, and stores the created digital key in the digital key area (303) of the storage module (300); and a key application creating part (413) that creates unique key application having said digital key. Said created key application may be provided to an arbitrary user together with said storage module (300), or when a user connects to an arbitrary service server (not shown) on the Internet, it may be provided in a form of Active X or security application, etc. from the service server.

Figure 3:
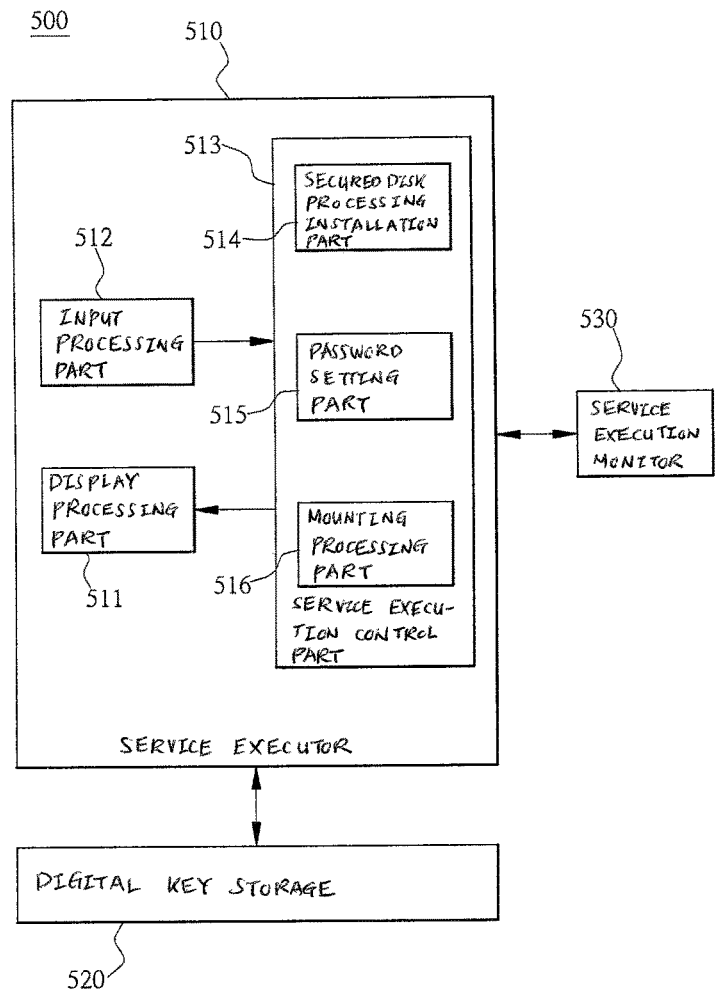
FIG. 3 is a drawing showing constitution of a key application module of the storage system that comprises the secured storage device according to the present invention.

FIG. 3 is a drawing showing constitution of the key application module of the storage system that comprises the secured storage device according to the present invention.

The key application module (500) includes a service executor (510), a digital key storage (520) and a service execution monitor (530).

The digital key storage (520) stores the same digital key with the digital key (excluding user option information) stored in the digital key area (303) of the secured disk (302) of the storage module (300) as explained above.

The service executor (510) controls overall operation of the storage system having the secured storage device according to the present invention. Especially, the service executor (510) processes overall operations that include activation and deactivation of the secured disk (302) of the storage module (300), and setting user option information according to the present invention.

More specifically, the service executor (510) includes a display processing part (511), an input processing part (512) and a service execution control part (513).

The display processing part (511) displays user interface means having user option information setting, security setting release and security setting means on the screen of a computer in which the key application is executed.

The input processing part (512) receives input corresponding to said user interface means, and outputs it to the service execution control part (513).

The service execution control part (513) includes a secured disk processing installation part (514) that creates the secured disk processor (240) in the kernel layer module (200) at the time of executing the key application; a password setting part (515) that provides user password setting means through the user interface means, which is provided through the display processing part (511), registers or changes user password through said user password setting means and stores it in the user option information area (307) of the digital key area (303) of the storage module (300) or the digital key storage (520); a mounting processing part (516) that makes the secured disk (302), that is, the secured disk sub-system (20) to be mounted or unmounted to the application module (100) through the input processing part (512), in case that it is mounted, when data process input/output occurs for the secured disk (302) of the storage system (300) by the application module (100), makes the secured disk processor (240) of said kernel layer module (200) to perform data processing, and in case that it is unmounted, makes it to stop.

The service execution monitor (530) monitors the operation status of said service executor (510), and when a forced termination event for said service executor (510) is detected, doses the secured disk (302). That is, at forced termination of the service executor (510), the service execution monitor (530) converts the security setting release mode to security setting mode and deactivates said secured disk (302). This is to prevent a hacker from terminating said service executor (510) forcefully and stealing data from the activated secured disk (302). Said forced termination event for the service executor may occur at operation termination of said service executor (510) and separation of the storage module including the secured disk (302). In case of Windows operating system, the operation termination of said service executor (510) may mean termination of process (*.exe) that drives said service executor (510).

Figure 4:
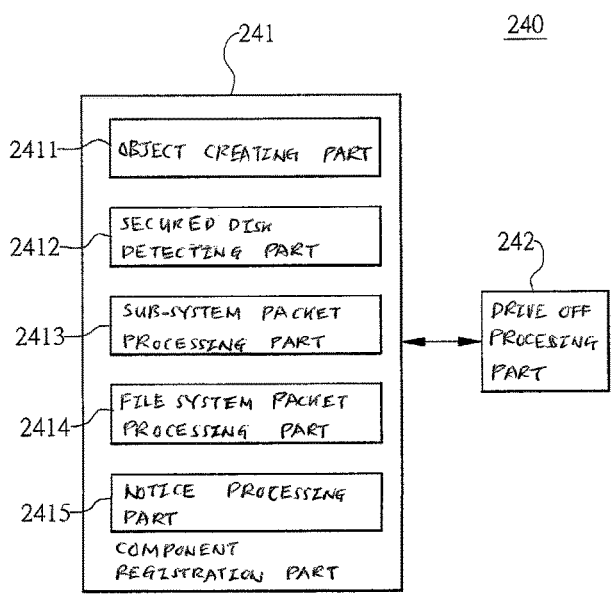
FIG. 4 is a drawing showing a secured disk processor of the storage system that comprises the secured storage device according to the present invention.

FIG. 4 is a drawing showing constitution of the secured disk processor of the storage system that comprises the secured storage device according to the present invention.

The secured disk processor (240) according to the present invention includes a component registration part (241) and a drive off processing part (242).

The component registration part (241) detects the storage module (300) having the secured disk (302), and activates the secured disk (302) according to processing of security mode release request or input/output for user option information and digital key of the secured disk (302) generated from the key application module (500). After said secured disk (302) is activated, said component registration part (241) creates connection information including object information, etc. to process input/output for the data of folders and files, etc. for the secured disk (302), directly processes input/output requests generated from said secured disk sub-system by the created connection information per type of input/output, and returns them to the file system processor (220), or transfers them to the device processor (230). However, most are commands to control use/stop, etc. for the secured disk (302). These commands are generated from the key application module (500). They are received directly from the key application module (500) without passing via the input/output handler (210) and file system processor (220), and all of them are processed at the secured disk processor (240).

At occurrence of secured disk deactivation events including said key application termination event, service executor (510) forced termination event, and storage device termination event, etc., the drive off processing part (242) deletes said created connection information, and thus terminates driving of the secured disk processor (240), and notifies drive off to the key application module (500).

Constitution of said component registration part (241) is explained in detail. The component registration part (241) includes an object creating part (2411), a secured disk detecting part (2412), a sub-system packet processing part (2413), a file system packet processing part (2414) and a notice processing part (2415).

The object creating part (2411) creates kernel device objects, which are connection information to directly process said requests generated from said key application module (500), and initializes data structure. If the operating system is Windows, said data structure items include the following items for secured disk in addition to basic items provided by Windows device driver structure.

1. The first item for creating thread for parallel processing of packets of said file system processing part and for storing the information 2. The second item for receiving the encrypting key for encrypting and decrypting the data, which are provided as being attached to input/output to the secured disk area, among packets of the file system processing part, from the key application module (500), and storing it.

3. The third item for receiving the digital key from the key application module (500) and storing it.

4. The fourth item for storing object handles of the storage module (300) having the secured disk (302).

5. The fifth item for storing information for plug and play notice, which is notified when the storage module having the secured disk is separated from the computer by the user.

The secured disk detecting part (2412) receives input of the digital key from said key application module (500), detects the storage module (300) having the secured disk (302) with said digital key, and detects the secured disk (302) of said storage module (300).

The sub-system packet processing part (2413) processes packets or requests generated from said secured disk sub-system (20).

After the secured disk (302) is activated at said application module (100) by processing of security mode release request, the file system packet processing part (2414) processes packets which said disk sub-system (10) or secured disk sub-system (20) transfers directly to the device processor (230) as requests for areas in the secured disk (302) through the file system processor (220), or packets transferred to the device processor (230) through the secured disk processor (240), and returns the result.

Said file system packet processing part (2414) processes following messages in case of Windows operating system.

1. IRP_MJ_CREATE: creation request for kernel object, which is transferred by the application module (explorer), returned with response that everything is processed normally.

2. IRP_MJ_CLOSE: deletion request for kernel object, which is transferred by the application module (explorer), returned with response that everything is processed normally.

3. IRP_MJ_READ: performs processing all read requests (even though a user requests writing, a read request may arrive to the kernel.) that are delivered when, by the application module, a user reads or stores an actual file, or performs operations including formatting, creating, deleting, etc. of virtual volume provided by the secured disk (302).

4. IRP_MJ_WRITE: processes all write requests that are delivered when, by the application module, a user reads or stores an actual file, or performs operations including formatting, creating, deleting, etc. of virtual volume provided by the secured disk (302).

5. IRP_MJ_DEVICE_CONTROL: processes all control requests that are delivered when, by the application module, a user reads or stores an actual file, or performs operations including formatting, creating, deleting, etc. of virtual volume provided by the secured disk (302); ignores ail except processes essential to normally operate the secured disk (302).

6. IOCTL_DISK_GET_DRIVE_GEOMETRY: constructs DISK_GEOMETRY information, which is requested by the file system processor (220: file system driver of Windows), as follows and returns it; this is the information to be recognized as a normal volume at the application module (the explorer of Windows) based on the information of the digital key for the secured disk.

A. number of cylinders: disk size for the digital key for the secured disk/512(basic sector size)/32/2
B. form of media: fixed media
C: number of tracks per cylinder: 2
D: number of sectors per track: 32
E: number of bytes per sector: 512

7. IOCTL_DISK_GET_LENGTH_INFO: constructs GET_LENGTH_INFORMATION_INFO information, which is requested by the file system driver, as follows and returns it; this is the information to be recognized as a normal volume or partition at the explorer of Windows based on the information of the digital key for the secured disk.

A: disk size: area size of digital key for the secured disk

8. IOCTL_DISK_GET_PARTITION_INFO: constructs PARTITION_INFORMATION information, which is requested by the file system driver, as follows and returns it; this is the information to be recognized as a normal volume or partition at the explorer of Windows based on the information of the digital key for the secured disk.

A. starting offset: 512
B. partition length: disk size for the digital key for the secured disk: 512
C: hidden sector: 1
D: partition number: 0
E: partition form: 0
F: boot indicator: FALSE
G: whether there is recognized partition: FALSE
H: whether the partition information is changed: FALSE 9. IOCTL_DISK_GET_PARTITION_INFO_EX: constructs PARTITION_INFORMATION_EX information, which is requested by the file system driver, as follows and returns it; this is the information to be recognized as a normal volume or partition at the explorer of Windows based on the information of the digital key for the secured disk.

A: partition form: 0
B: starting offset: 512
C: partition length: disk size for the digital key for the secured disk: 512
D: hidden sector: 1
E: partition number: 0
F: whether the partition information is changed: FALSE
G: partition form: 0
H: boot indicator: FALSE
I: whether there is recognized partition: FALSE
J: hidden sector: 1

The notice processing part (2415) receives the Plug and Play notice, which is notified when a certain storage module (300) that is used as an ordinary disk (301) or secured disk (302) is separated from a computer by a user and processes it. Especially, when the storage module (300) having the secured disk (302) is removed from the computer by the user, because the state is that the volume for the secured disk has already been mounted by the key application module (500) and is being provided to the application module (100), notification is given back to the key application module (500) through this processing, and a series of processes are performed so that access to the volume for the secured disk by the explorer would no longer occur.

Figure 6:
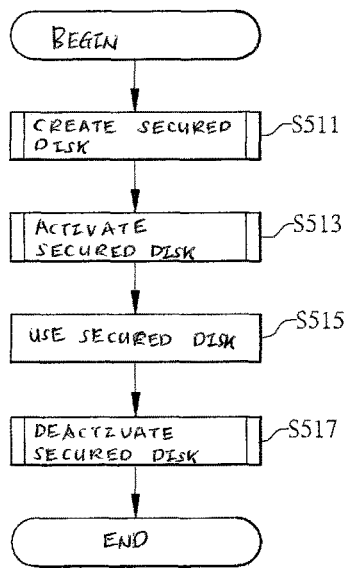
FIG. 6 is a flow diagram showing method of managing the secured storage device in the storage system that comprises the secured storage device according to the present invention.

FIG. 6 is a flow diagram showing method of managing the secured storage device in the storage system that comprises the secured storage device according to the present invention.

Referring to FIG. 6, the secured disk creation application module (400) creates a secured disk (302) on a storage module (300), which is an arbitrary storage device, according to the present invention (S511). Said secure disk (302) may be created at production of said storage module (300) or at computer manufacturing process for desktop computers, notebook computers, etc. which include said storage module (300), or may be created by a computer user. Because the purpose of the present invention is to improve security by providing key application having unique digital key to a user, it is preferable to construct a secured disk in the production process of a storage module (300). Creating procedure of the secured disk is explained in detail afterwards referring to FIG. 7.

After the secured disk is created, when the key application is executed at a computer to which the storage module (300) having the secured disk is connected, a key application module (500) is created as explained above, and the created key application module (500) constructs a secured disk processor (240) to the kernel layer module (200). After construction of said secured disk processor (240), the key application module (500) displays user interface means on a screen, sets up password by the user, and then when a password identical to the established password is input, detects the storage module (300) having the secured disk (302), mounts the secured disk processor (240) on the application module (100), and activates the detected secured disk (302) as the drive (S513). At this time, the secured disk (302) is mounted to the application module (100) as a virtual volume. The method for activating the secured disk (302) is explained in detail referring to FIG. 8.

After activation of said secured disk, the application module (100) displays said secured disk (302) as an ordinary drive, and according to a users request, uses the secured disk (302) by storing and reading data to and from said secured disk (302) (S515).

When an event of deactivating secured disk occurs during use of said secured disk (302), the key application module (500) deactivates the secured disk (302) by deactivating or deleting the secured disk sub-system (20) and the secured disk processor (240) installed on the kernel layer module (200), and terminates itself (S517). The deactivation procedure for said secured disk (302) is explained in detail referring to FIG. 9.

Figure 7:
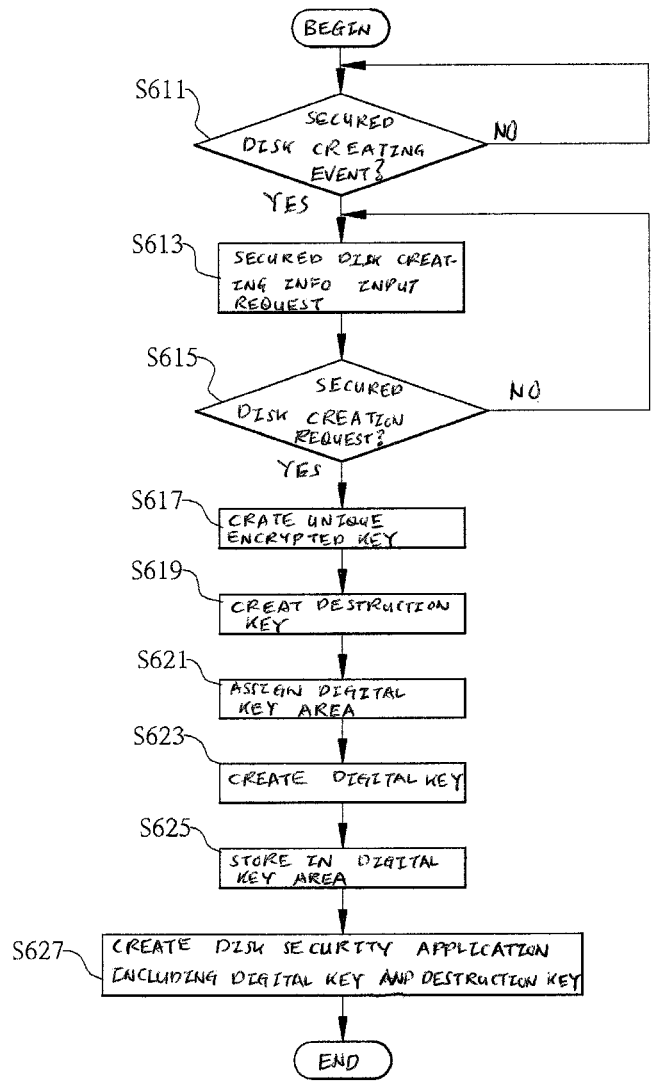
FIG. 7 is a flow diagram showing method of creating a secured disk for the secured storage device managing method in the storage system that comprises the secured storage device according to the present invention.

FIG. 7 is a flow diagram showing method of creating a secured disk for the secured storage device managing method in the storage system that comprises the secured storage device according to the present invention.

Referring to FIG. 7, the secured disk creation application module (400) displays the user interface means that is displayed on a computer screen, and checks whether a secured disk creating event by clicking the button etc. to create a secured disk from said user interface means is occurred (S611). Said secured disk creating event may be occurred with secured disk creating button, etc. of the user interface means as explained above, and also may be the execution of the secured disk creating application itself.

said secured disk creation application module (400) requests input of secured disk creating information by displaying the secured disk creating user interface means, to which the secured disk creating information for creating the secured disk can be input at occurrence of secured disk creating event (S613). Said secured disk creating user interface means may be means for setting area range of secured disk. Said secured disk area range may be the starting sector and capacity (size of secured disk), etc. for said secured disk (302).

After displaying said secured disk creating user interface means, the secured disk creation application module (400) checks whether a secured disk creating request is made through thorough said secured disk creating user interface means (S615).

If a secured disk creating request is made, the secured disk creation application module (400) creates unique encryption key and destruction key and stores them (S617, S619).

After creation of said encrypted key and destruction key, the secured disk creation application module (400) assigns a digital key area having predetermined size from said starting sector (S621).

When the digital kea area is assigned, the secured disk creation application module (400) creates a digital key, which includes said input encryption key, destruction key, starting sector information, disk size information, disk serial number and at least one sector offset (S623), then stores it in the digital key area (303) (S625).

After creation of said secured disk, the secured disk creation application module (400) creates unique key application having said digital key (S627).

Figure 8:
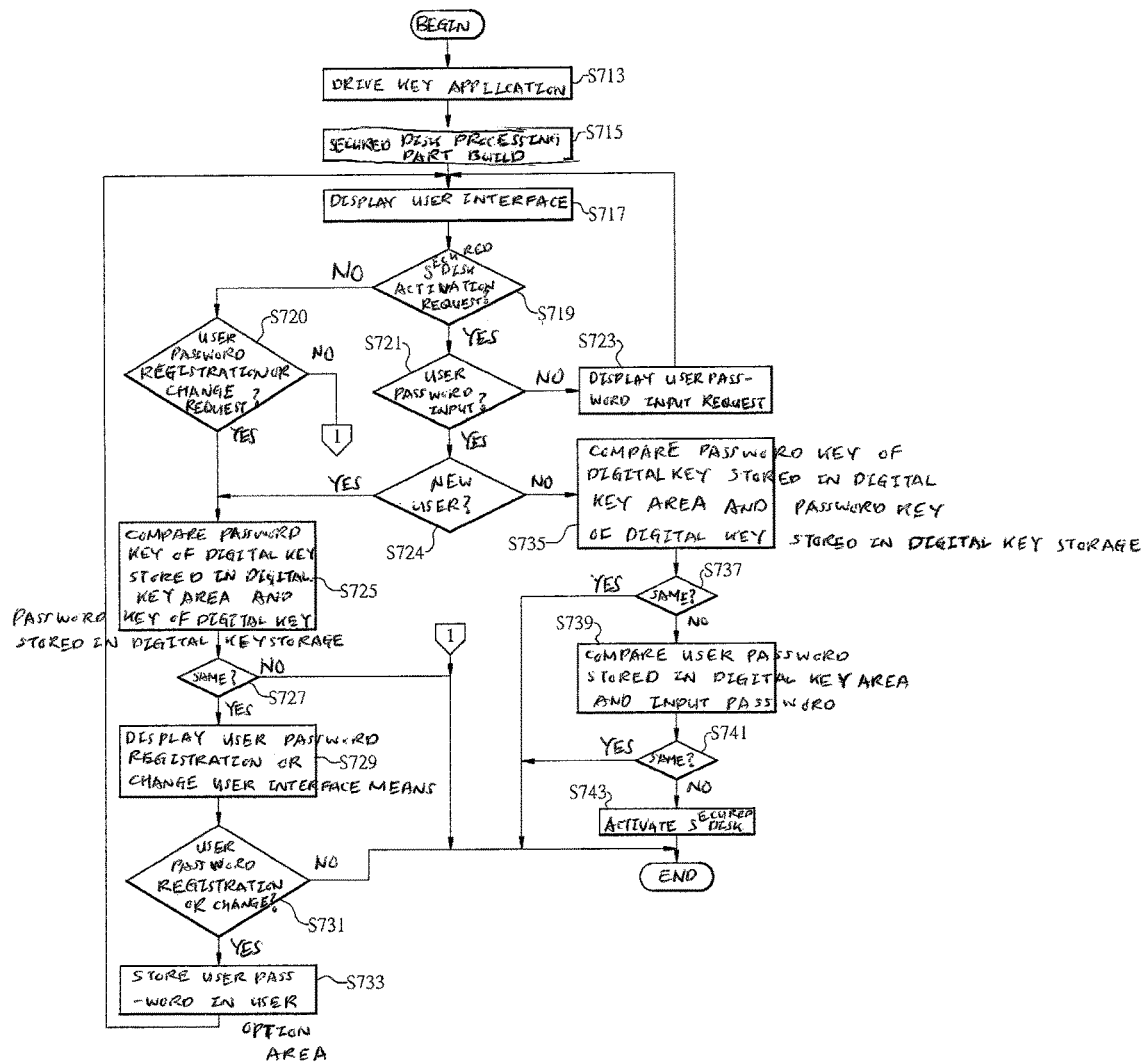
FIG. 8 is a flow diagram showing method of activating the secured disk for the secured storage device managing method in the storage system that comprises the secured storage device according to the present invention.

FIG. 8 is a flow diagram showing method of activating the secured disk for the secured storage device managing method in the storage system that comprises the secured storage device according to the present invention.

As shown on FIG. 8, when the key application by the user is executed, the key application module (500) is driven (S713).

Thus driven key application module (500) creates the secured disk processor (240) on the kernel layer module (200) (S715).

After creation of the secured disk processor (240), the key application module (500) displays the user interface means on the computer screen (S717), and checks whether an activation request for secured disk is made (S719), and whether request for user password registration or change is made (S720).

At occurrence at secured disk activation request, the key application module (500) checks whether user password is input through the user interface means (S721). If a user password has not been input, it displays on the screen a message requesting to input the user password (S723), and if a user password has been input, it checks whether there is existing registered user password, and decides whether the user is a new user or an existing user (S724).

At the new user decision step (S724), if she is a new user, or at occurrence of user password registration or change request (S720), the key application module (500) compares the encryption key of the digital key stored in the digital key area (303) and the encryption key of the digital key stored in the digital key storage (520) (S725), and checks whether they are the same (S727). That is, it checks whether the digital key stored in the secured disk (302) and the digital key that the key application is having are the same.

The key application module (500) is terminated if said two digital keys are not the same. If they are the same, it displays user interface means for user password registration or change (S729), and checks if user password registration or change request occurs (S731).

If there is request for registering or changing password, the user password, which was input through the user interface means for user password registration or change, is stored as user option information at each of the original digital key (3054) and duplicate digital key (305-2, . . . , 305-n) of the digital key area (303) as shown on FIG. 5 (S733).

On the other hand, if it is decided not to be a first user at said new user deciding step (S275), the encryption key of the digital key stored in the digital key area (303) and the encryption key of the digital key stored in the digital key storage (520) are compared (S735), and whether they are the same is checked (S737).

If the encryption keys of the digital keys are the same, the key application module (500) compares the user password stored in the user option information area (307) of the digital key area (303), and the password input (S739), and decides whether they are the same (S741).

If the input user password and the registered user password are the same, the key application module (500) mounts the secured disk sub-system (20) to the application module (100) thereby activating the secured disk (302) (S743).

In the above explanation, checking whether the digital key stored in the digital key area (303) of the secured disk (302) and the digital key stored in the digital key storage (520) are the same is performed after deciding new user. Alternatively, it may be constructed that if the secured disk processor (240) is constructed (S715), the key application module (500) may perform the digital key authentication after searching the secured disk (302) through the secured disk processor (240).

Figure 9:
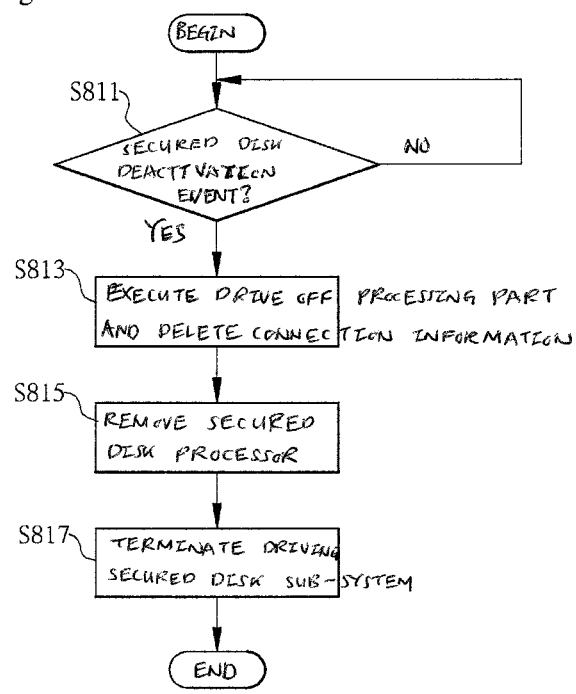
FIG. 9 is a flow diagram showing method of deactivating the secured disk for the secured storage device managing method in the storage system that comprises the secured storage device according to the present invention.

FIG. 9 is a flow diagram showing method of deactivating the secured disk for the secured storage device managing method in the storage system that comprises the secured storage device according to the present invention.

The key application module (500) checks whether a secured disk deactivating event occurs (S811), Said secured disk deactivating event may occur by normal or forced termination of the key application, or separation of the storage module (300) having the secured disk (302), etc.

At occurrence of a secured disk deactivation event, the key application module (500) drives the drive off processing part (242) to delete connection information created at activation of the secured disk (S813).

After deleting said connection information, the key application module (500) deactivates or removes the secured disk processor (240) (S815), and terminates itself (S817).

Figure 10:
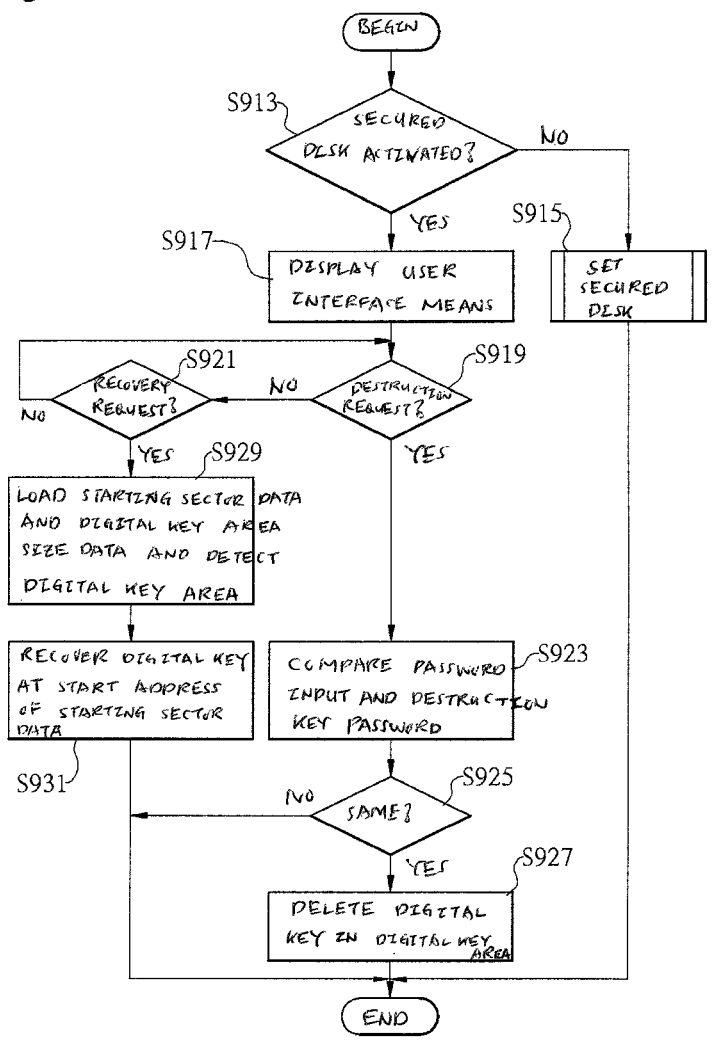
FIG. 10 is a flow diagram showing method of destructing and recovering the secured disk for the secured storage device managing method in the storage system that comprises the secured storage device according to the present invention.

FIG. 10 is a flow diagram showing method of destructing and recovering the secured disk for the secured storage device managing method in the storage system that comprises the secured storage device according to the present invention.

The key application module (500) checks whether the secured disk (302) is activated (S913).

If the secured disk has not been activated, as explained above with FIG. 8, the secured disk activating process will be performed.

However, if the secured disk has been activated, the key application module (500) will display or will be displaying user interface means on the screen (S917).

The key application module (500) checks whether there is a destruction request by input of destruction key, that is, the destruction password, through the displayed user interface means (S919), or whether there is a recovery request (S921).

At occurrence of destruction request, the key application module (500) compares the destruction key input through the user interface means and the destruction key of the digital key stored in the digital key area (303) or the digital key storage (520) (S923), and checks whether they are the same (S925).

If the destruction key input and the destruction key of the digital key are identical, the key application module (500) deletes the digital key at the digital key area (303) (S927).

On the other hand, at occurrence of recovery request, the key application module (500) loads the starting sector data and the size data of the digital key area from the digital key kept by the digital key storage (520), finds the digital key area (303) at the storage module (300) (S929), and stores the digital key, which is stored in the digital key storage (520), to thus found digital key area (303), thereby recovering the secured disk, which was logically destructed (S931).

Meanwhile, the present invention is not limited to the above-explained best embodiment. A person having ordinary skill in the corresponding art field can readily understand that various improvements, changes, replacements or additions are possible without deviating from the scope of the invention. If such using the improvements, changes, replacements or additions belong to the scope of the attached claims, their technical constitutions are also considered to belong to the invention.

The invention claimed is:

1. A storage system comprising a secured storage device characterized in that the secured storage device comprises:
a storage module comprising a secured disk of arbitrary size comprising a digital key area in which a digital key is stored and a secured data area that is encrypted with said digital key;
a kernel layer module that deactivates said secured disk in a security setting mode, and activates said secured disk by said digital key in a security setting release mode; and
a key application module that mounts a secured disk sub-system, which processes input/output requests for said activated secured disk, to an application module that can manage data stored in said storage module at a security setting release request by execution of a key application that comprises a digital key that is identical to said digital key; controls said kernel layer module and activates the secured disk by the digital key of said key application, which is identical with the digital key stored in the digital key area of said secured disk; and processes input/output requests for the data stored in said activated secured disk through said kernel layer module,
wherein said key application module comprises:

a digital key storage that comprises a digital key that is identical to the digital key stored in the digital key area of the secured disk;
a service executor that is activated at execution of said key application, installs a secured disk processor at said kernel layer module, activates said secured disk by said digital key at setting of user password and input of the set user password, and processes input/output requests to said secured disk; and
a service execution monitor that monitors said service executor, sets up said security setting mode at occurrence of an event forcefully terminating the service executor, unmounts said secured disk sub-system from said application module and terminates the service executor.

2. The storage system of claim 1, wherein said service executor comprises:
a display processing part that provides a user interface means comprising security setting and release means to be displayed on a screen at execution of said key application;
an input processing part that processes input data that is input through said user interface means; and
a service execution control part that comprises:
a secured disk processing installation part that installs the secured disk processor at execution of said key application and deletes said secured disk processor at termination of the key application,
a password setting part that receives input of a user password for security setting through a security setting and release means of the user interface means, stores and sets the user password; compares the user password that is input through said security setting and release means and a pre-set password at occurrence of a security setting release request; and activates said secured disk after authentication,
a mounting processing part that monitors input/output occurring at the application module through said input processor, and when a data processing input/output event for the secured disk of the activated storage module is detected, processes the input/output request according to processing of the corresponding data through the secured disk processor of said kernel layer module.

3. The storage system of claim 1, further comprising a secured disk creation application module that provides a secured disk setting means on a computer screen, receives input of a capacity including a starting sector to be set for a secured disk through said secured disk setting means and sets the secured disk, sets a digital key area of predetermined capacity from said starting sector, and stores the digital key in said digital key area.

4. The storage system of claim 3, wherein said secured disk creation application module comprises:
a secured disk setting part that displays a user interface means on a screen and receives secured disk creating information that includes starting sector of the secured disk, secured disk volume data, and secured disk size data;
a digital key constitution part that receives the secured disk creating information from said secured disk setting part, creates a unique password key and destruction key, creates a digital key including said secured disk creating information, password key, destruction key, sector offset and secured disk type information, and stores the created digital key to the digital key area of the storage module; and a key application creating part that creates a unique key application that comprises said digital key.

5. The storage system of claim 1, wherein said digital key comprises a disk volume name, which is used at security setting release of the secured disk, a disk serial number, disk size data, starting sector data, an encryption key uniquely assigned per said key application, and sector offset data that indicates the distance to a next duplicate digital key.

6. The storage system of claim 1, wherein said digital key further comprises automatic lock setting data that specifies whether conversion to security setting mode that closes said secured disk is automatically performed when there is no use of a computer for a pre-determined time.

7. The storage system of claim 6, wherein said kernel layer module comprises:
   an input/output handler that handles input/output requests for folders and files, which are generated from the disk sub-system of the application module;
   a file system processor that receives input of said requests form said input/output handler at said security setting mode and processes the requests, and performs processing folders and files of said secured disk area at said security setting release mode;
   a device processor that is connected between said file system processor and the storage module, which is a physical storage device, and controls the storage module according to said request created at said file system processor; and
   a secured disk processor that is constructed by said key application module, detects the storage module comprising the secured disk and the secured disk of said storage module, receives input/output requests for folders and files created by the secured disk sub-system of said application module through said input/output handler and the file system processor, and directly processes the input/output requests or processes through said device processor depending on the type of the input/output requests.

8. The storage system of claim 7, wherein said secured disk processor comprises:
   a component registration part that detects the storage module comprising the secured disk, detects the secured disk in the storage module, creates connection information to process input/output requests for folders and files in the secured disk created by the key application module, and transfers the request created from said key application module with the created connection information to said file system processor; and
   a drive off processing part that deletes said created connection information at occurrence of said key application termination event and thereby terminates driving of the secured disk processor.

9. The storage system of claim 8, wherein said component registration part comprises:
   an object creating part that creates a kernel device object for direct processing of said request created from said key application module, and initializes data structure;
   a secured disk detecting part that receives input of the digital key from said key application module, and detects the storage module comprising the secured disk with said digital key;
   a sub-system packet processing part that processes packets for the request created from said key application module; and
   a file system packet processing part, which at occurrence of input/output requests for the secured disk area by said disk sub-system, performs processing of packets for said input/output requests and then returns the result.

10. The storage system of claim 9, wherein said data structure comprises:
   a first item for creating thread for parallel processing of packets of said file system processing part and for storing the information;
   a second item for receiving the encryption key for encrypting and decrypting the data, which are provided as being attached to input/output to the secured disk area among packets of the file system processing part, from the key application module, and storing the encryption key;
   a third item for receiving the digital key from the key application module and storing the digital key;
   a fourth item for storing object handles of the storage module having the secured disk; and
   a fifth item for storing information for plug and play notice, which is notified when the storage module having the secured disk is separated from the computer by the user.

11. The storage system of claim 8, wherein when the automatic lock setting data is set for automatic lock, said key application module counts the time in which the computer is not used, and if there is no computer use for a predetermined time, drives said drive off processing part, thereby deletes the connection information registered by the component registration part, deactivates or deletes the secured disk processor, and terminates itself, thereby setting the security setting mode.

12. The storage system of claim 1, wherein said digital keys are constructed to be two or more in said digital key area, and starting sector data for each of said plurality of digital keys is constructed random.

13. The storage system of claim 12, wherein each of said digital keys further comprises user option information set by a user after installation of said key application.

14. The storage system of claim 13, wherein said user option information comprises disk volume name, user password, password for destruction, and automatic lock setting data that specifies whether conversion to security setting mode that closes said secured disk is automatically performed when there is no use of a computer for a pre-determined time.

15. The storage system of claim 1, wherein the area for the secured disk of said storage module is partitioned into unassigned area.

16. A method of managing a storage system comprising a secured storage device, wherein the secured storage device is controlled by a computer, comprising steps of:
   creating secured storage device, in which a secured disk creation application module that is created and activated by execution of a secured disk creation application by the computer creates a storage device comprising an ordinary disk and a secured disk that comprises a digital key area in which a unique digital key is stored and a secured data area encrypted by said digital key;
   activating secured disk, in which a key application module activated by execution of a key application by the computer, wherein the key application comprises a digital key identical with the digital key stored in the digital key area of said secured disk, finds the secured storage device comprising the digital key area comprising the digital key identical with said digital key, hides said secured disk area in a security setting mode, at occurrence of security setting mode release request by user password of a user mounts a secured disk sub-system in an application module, makes the volume of said secured disk visible by its own digital key identical with the digital key stored in said digital key area, thereby sets that data can be input/output to said secured disk; and using secured disk, in which said secured disk sub-system inputs/outputs data to said activated secured disk, wherein said creating secured storage device step comprises steps of:

setting up secured disk area, in which the secured disk creation application module provides secured disk setting up means through a display processing part, receives input of capacity including a starting sector for setting up as secured disk through said secured disk setting up means, and sets up a secured disk; and constructing digital key, in which said secured disk creation application module sets up a digital key area of predetermined capacity from the starting sector and constructs a digital key in said digital key area.

17. The method of claim 16, wherein said creating secured storage device step further comprises a step of creating a key application that creates a key application comprising said digital key.

18. The method of claim 16, wherein said digital key comprises a disk volume name, which is used at security setting release of the secured disk, a disk serial number, disk size data, starting sector data, an encryption key uniquely assigned per said key application, and sector offset data that indicates the distance to a next duplicate digital key.

19. The method of claim 18, wherein said digital keys are constructed to be two or more in said digital key area, and the staring sector data for each of said plurality of digital keys is constructed random.

20. The method of claim 16, wherein said activating secured disk step comprises steps of:

constructing secured disk processor in which at execution of the key application, the driven key application module constructs a secured disk processor in a kernel layer module;

displaying user interface in which said key application module displays user interface means;

checking secured disk activation request in which occurrence of secured disk activation request through said user interface means is checked;

deciding user password input in which if said activation request occurred, whether a user password which is input through said user interface means is input is checked; and activating secured disk in which if it is decided that there is an input at said deciding user password input step, the user password input is compared with a pre-set password, and if they are identical, said secured disk is activated.

21. The method of claim 20, wherein said activating secured disk step further comprises steps of:

new user deciding, in which at said deciding user password input step, if it is decided that a user password is input, whether the user is a new user is decided according to whether there is a pre-registered password;

user password registration user interface means displaying, in which if the user is a new user, user interface means comprising user password registration means is displayed; and user password registration, in which if user password is input through said user interface means, the user password input is stored in a user option area of the digital key.

22. The method of claim 16, further comprising a step of deactivating secured disk, in which at occurrence of secured disk deactivation event during use of said secured disk, the key application module deletes a secured disk processor, requests termination of driving the key application module to the operating system, thereby deactivating the secured disk.

23. The method of claim 22, wherein said deactivating secured disk step comprises steps of:

deleting secured disk processor, in which at occurrence of key application driving termination event during use of said secured disk, the key application module drives a drive off processing part to delete registered components thereby removing the secured disk processor; and terminating driving the key application module, in which said key application module request termination of its driving to the operating system, thereby terminating driving.

24. The method of claim 16, further comprising a step of destructing secured disk, in which if a destruction password is input through user interface means displayed by activation of the key application, the key application module compares the destruction password input with a destruction password of the digital key, and if they are identical, permanently deletes the digital key in the digital key area of said secured disk thereby destructing data stored in the secured data area of the secured disk so that the data cannot be used.

25. The method of claim 24, further comprising a step of recovering destructed secured disk, in which after said destructing secured disk step, the key application module driven by re-execution of said key application finds the digital key area of the destructed secured disk with starting sector data of the digital key and the digital key area data stored in a digital key storage, and stores the digital key in the digital key area found thereby activating said secured disk again.

* * * * *